Sept. 25, 1934.   L. K. SNELL   1,974,589
BRAKE
Filed Dec. 20, 1929
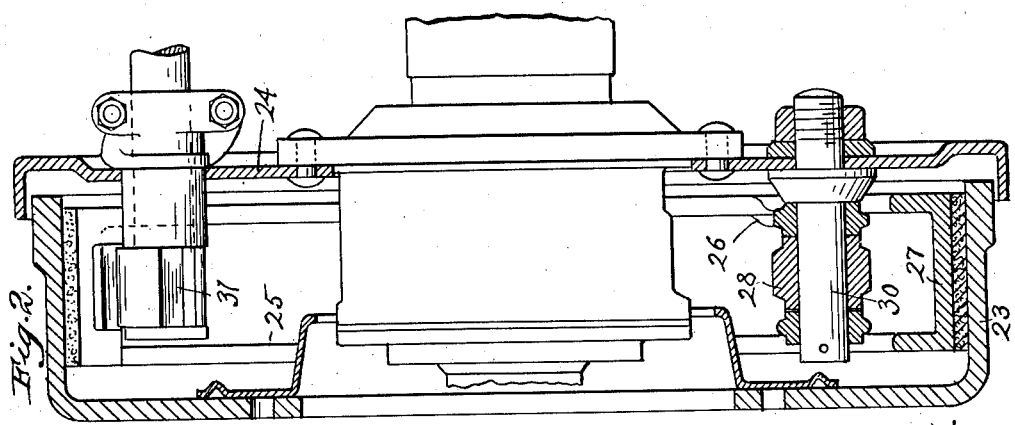
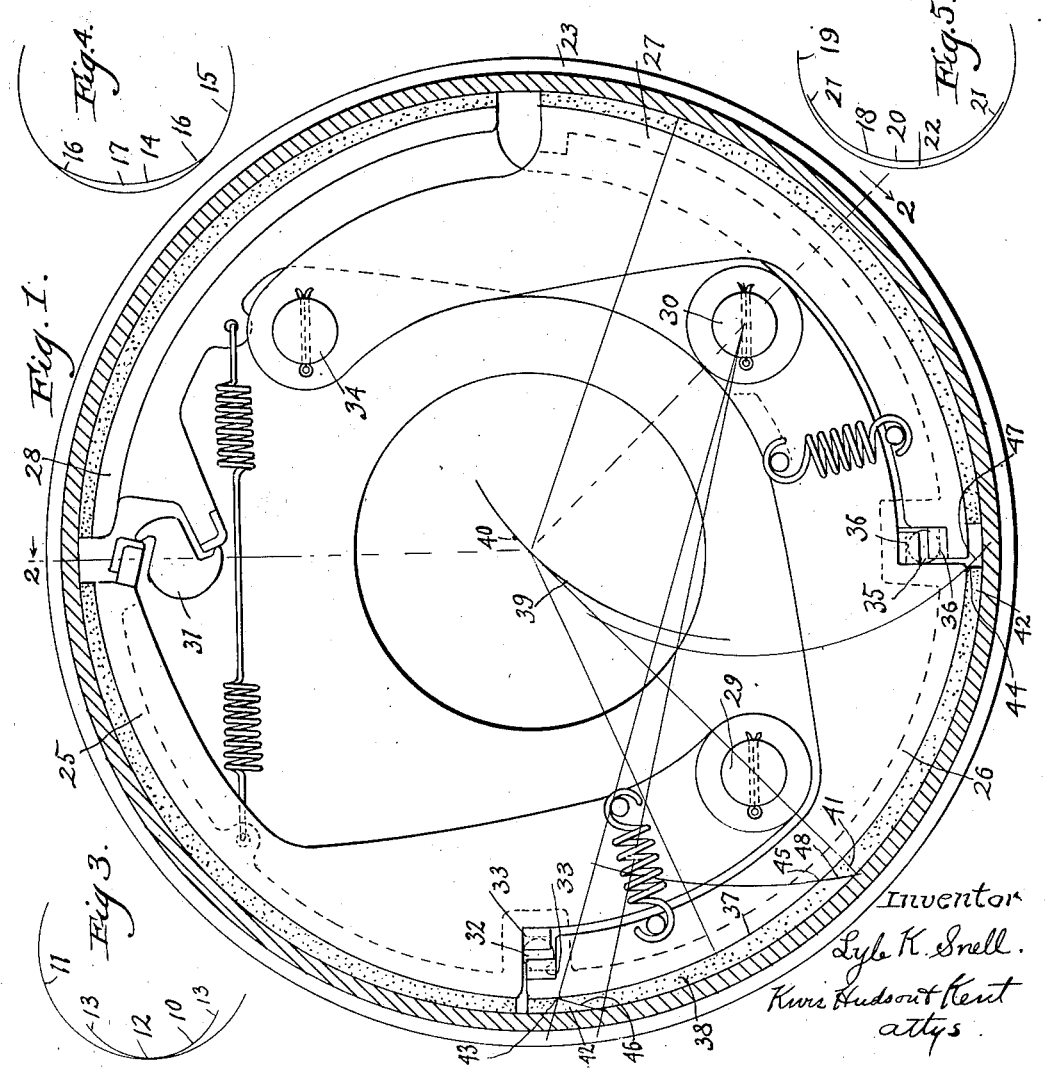
Inventor
Lyle K. Snell.
Kwis Hudson Kent
attys.

Patented Sept. 25, 1934

1,974,589

UNITED STATES PATENT OFFICE 1,974,589

BRAKE

Lyle K. Snell, Detroit, Mich., assignor to Eaton Manufacturing Company, Cleveland, Ohio, a corporation of Ohio Application December 20, 1929, Serial No. 415,395

15 Claims. (Cl. 188—78)

This invention relates generally to vehicle brakes, and has particular reference to an improved form of brake having the parts thereof constructed and arranged so as to attain maximum efficiency and length of life of the brake lining.

In vehicle brakes, as heretofore constructed, it has been the general practice to make and assemble the brake shoes so that the curved surfaces thereof, to which the brake lining is attached, are substantially concentric with the curved surface of the brake drum, that is to say, that in the construction and arrangement of these parts, the space for the brake lining is provided by making the curved surface of the brake shoe of a radius which is smaller than the radius of the drum by an amount approximately equal to the thickness of the lining. Thus the brake lining, as heretofore used, has been uniform in thickness with the radius of curvature of its drum engaging surface, greater than the radius of its shoe engaging surface. In the operation of these brakes, as heretofore constructed with lining of uniform thickness and with shoes having a radius of curvature which is different from the radius of the drum, certain portions of the surface of the lining are pressed against the drum surface with greater force than are other portions of its surface, with the result that those portions under greater pressure wear away more rapidly and may be completely worn away and expose the surface of the brake shoe while other portions of the lining are still serviceable. This rapid wearing away of certain portions of the lining renders the brake less efficient and makes necessary frequent renewals of the lining.

It is, therefore, an object of this invention to provide a brake having the parts thereof constructed and arranged to provide a lining thickness at any point which will be substantially proportional to the rate of lining wear at that point.

Another object of this invention is to provide a brake in which the useful and efficient life of the brake lining is prolonged by providing increased lining thickness at those points where lining wear occurs most rapidly.

A further object of this invention is to provide a form of brake in which the wearing life of the intermediate portions of the brake lining will be substantially the same as the wearing life of the end portions of the brake lining.

The invention may be further briefly summarized as consisting in certain novel combinations and arrangements of parts hereinafter described and particularly set out in the appended claims.

In the accompanying sheet of drawing,

Fig. 1 is a side elevational view showing the arrangement of parts with the brake drum in section;

Fig. 2 is a cross-section taken on line 2—2 of Fig. 1; and

Figs. 3, 4 and 5 are diagrammatic illustrations of certain geometrical truths.

In vehicle brakes embodying the principles of my invention, the cooperating surfaces of the brake shoes and brake drum are so shaped and arranged that the most efficient use of the brake lining is attained throughout the life of the brake. In Figs. 1 and 2 of the drawing illustrating my invention, I have shown one form of brake to which this principle may be applied, but it should be understood, however, that my invention is not limited in its application to any particular form of brake, but may be embodied in brake constructions of various types regardless of whether the shoes are individually pivoted or are of the free floating type.

In order that my invention may be more readily understood, and the scope of its useful application more fully appreciated, reference is made to certain geometrical truths, upon which the principles of my invention are based, and which govern the movements of curved surfaces, such as cooperating braking surfaces, into engagement with each other. One of the geometrical truths to which I refer is illustrated diagrammatically in Fig. 3, and teaches that when an arcuate surface 10, lying within an annular surface 11 of greater radius, moves bodily into contact with the annular surface, the initial point of tangency 12 between the surfaces will be at approximately the mid-portion of the arcuate surface. From this statement of fact, it follows obviously that, with the mid-portion of the arcuate surface tangent to the annular surface, the end portions 13 of the arcuate surface will be in spaced relation to the annular surface. On the other hand, as illustrated in Fig. 4, if the radius of the arcuate surface 14 is greater than the radius of the annular surface 15 within which it lies, the initial points of tangency, when the arcuate surface is moved bodily into contact with the annular surface, will be at the end portions 16 of the arcuate surface, while its mid-portion 17 will be spaced from the annular surface. Another of these geometrical truths is illustrated in Fig. 5, and teaches that when an arcuate surface 18 is arranged within an annular surface 19 of the same radius and spaced therefrom, the mid-portion 20 of the arcuate surface will be spaced further from the annular surface than the end portions 21 of the arcuate surface, but upon moving the arcuate surface bodily into contact with the annular surface, all points on the arcuate surface move into tangency with the annular surface simultaneously.

The geometrical truths diagrammatically illustrated in Figs. 3 and 4 govern the action which takes place between the cooperating surfaces in brakes as heretofore constructed, while the geometrical truth illustrated in Fig. 5 governs the action which takes place between the cooperating surfaces in a brake constructed according to my invention. In a practical embodiment of this truth, as hereinafter disclosed, I provide a section of brake lining shaped to fill the space 22 between the arcuate surface 18 and the annular surface 19, and, obviously, when the lining is completely worn out the arcuate surface will coincide with a portion of the annular surface.

The brake, which I have shown for the purpose of illustrating a practical application of the principles of my invention, comprises a rotatable brake drum 23, a stationary backing plate 24 mounted upon a portion of the vehicle, and a plurality of brake shoes 25, 26, 27 and 28 arranged within the brake drum. The shoe 25 is pivoted upon an anchor pin 29 carried by the backing plate and is arranged with its free end in opposed relation to the free end of the shoe 28 which is pivoted upon an anchor pin 30 also carried by the backing plate. In moving these shoes into cooperation with the surface of the drum, during an application of braking force, they are swung about their respective pivot pins by means of a suitable actuating member, such as the cam 31 which wedges their free ends apart. As the shoe 25 swings outwardly to engage the surface of the drum, braking force is transmitted to the shoe 26, which is arranged to swing about the anchor pin 30. This braking force is transmitted to the shoe 26 by means of the roller 32, which is arranged between bearing surfaces 33 provided on the overlapping portions of these shoes. In a similar manner, the outward movement of the shoe 26 causes braking force to be transmitted to the shoe 27 which is arranged with one end thereof pivoted upon the anchor pin 34. This braking force is transmitted to the shoe 27 by means of the roller 35 which is interposed between bearing surfaces 36 carried by overlapping portions of these shoes.

In order to simplify the description, I shall refer only to the shoe 26 in describing the application of the principles of my invention, but it should be understood that the description applies also to the other shoes. In constructing this shoe, the outer surface 37 thereof, to which the brake lining 38 is applied, is formed with a radius of curvature which is substantially equal to the radius of curvature of the drum. The center for this curved surface of the shoe is selected so that when the shoe is in assembled position within the drum, this center will lie upon the arc 39 which passes through the center of the drum and has the axis of the anchor pin 30 for its center. This center for the curved surface of the shoe is represented in Fig. 1 by the point 40, and it will be noted that this point is offset from the center of the drum a distance which is approximately equal to the desired maximum thickness of the lining. The relation between the curved surface of the brake shoe and the curved surface of the drum is such as to provide a lining space having maximum thickness at its mid-portion, represented at 41, and minimum thickness at its end portions 42. Thus it will be seen that the brake lining, which is provided in this space, and which may be secured to the shoe in any suitable manner, is substantially crescent-shaped having maximum thickness at its mid-portion and minimum thickness at its end portions.

For the purpose of illustrating the displacement or movement of the shoe from the drum engaging position with new lining to the drum engaging position with worn-out lining, I have indicated the paths of movement of points 43 and 44, located adjacent the ends of the curved surface of the brake shoe, and of the point 45 located adjacent the mid-portion of this curved surface. The paths of these points are represented, respectively, by the arcs 46, 47 and 48 which have the axis of the anchor pin 30 as their center. Since all three of the points referred to move about a common center, it is obvious that they must move through corresponding angular distances or, in other words, when the lining is completely worn out, all portions of the curved surface of the shoe move into contact with the curved surface of the drum. While I have described the action of a shoe, which is so constructed that its curved surface moves into coincidence with the surface of the drum when the lining is completely worn out, by referring specifically to the pivoted shoe 26 shown in Fig. 1 of the drawing, it will, however, be apparent to those skilled in the art that in any brake in which the surface of the shoe is curved to the same radius as the surface of the drum, this result, namely, the movement of the surface of the shoe into coincidence with the surface of the drum when the lining is completely worn out, obtains regardless of whether the shoe is mounted upon a fixed pivot or is of the free floating type.

From the foregoing description it will now be understood that in brakes constructed according to the principles of my invention, those portions of the brake lining which wear more rapidly by reason of their being subjected to heavier pressures, are so shaped that at any point the thickness of the lining is proportional to the rate of wear at that point, with the result that all portions of the brake lining arrive at a worn-out condition at substantially the same time. With the arrangement which I have provided, the brake linings need be renewed only when they are completely worn out, with the result that replacements of brake linings will be necessary at less frequent intervals than with arrangements heretofore used. It will also be readily seen that since all portions of the lining arrive at a worn-out condition substantially simultaneously, the effective area of the brake lining is not diminished, as the brake lining becomes worn, thus insuring that brakes constructed according to the principles of my invention will afford full and efficient braking action throughout the life of their brake linings.

While I have described in detail the principles of my invention and have illustrated the application of these principles by referring to a particular form of brake, it should be understood, however, that I do not intend to restrict the scope of my invention in any way except as limited by the terms of the appended claims.

Having thus described my invention, what I claim is:

1. A brake comprising a rotatable drum having a curved surface, a substantially rigid brake shoe arranged for cooperation with said drum, said shoe having a curved surface of the same radius as the curved surface of said drum; and brake lining interposed between said curved surfaces, said lining being shaped to conform to the curvature of said surfaces.

2. A brake comprising a rotatable drum having a curved surface, a substantially rigid brake shoe arranged for cooperation with said drum, said shoe having a curved surface of the same radius as the curved surface of said drum, and a section of brake lining having opposite surfaces thereof curved to the same radius, one side of said lining being in contact with the curved surface of said shoe and the other side of said lining being presented for contact with the curved surface of said drum.

3. A brake comprising a rotatable drum having a curved surface, a brake shoe arranged for cooperation with said drum and having a curved surface of the same radius as the curved surface of said drum, and brake lining secured to the curved surface of said shoe for engagement with the curved surface of said drum, the centers for the radii of said curved surfaces being spaced apart a distance which is equal to the desired maximum thickness of said lining, when the lining contacts with both of said surfaces and is in an unworn condition.

4. A brake comprising a rotatable drum having a curved surface, a substantially rigid brake shoe arranged for cooperation with said drum and having a curved surface of substantially the same radius as the curved surface of said drum, and a substantially crescent-shaped section of brake lining held against the curved surface of said shoe for cooperation with the curved surface of said drum.

5. A brake comprising a rotatable drum having a curved surface, a supporting member adjacent said drum, a brake shoe pivoted on said supporting member for cooperation with said drum and having a curved surface of substantially the same radius as the curved surface of said drum, and a substantially crescent-shaped section of brake lining held against the curved surface of said shoe for cooperation with the curved surface of said drum.

6. A brake comprising a rotatable drum having a curved surface, a brake shoe arranged for cooperation with said drum and having a curved surface of substantially the same radius as the curved surface of said drum, and brake lining interposed between said curved surfaces, said brake lining having an intermediate portion of maximum thickness and being tapered from said maximum thickness to a minimum thickness at its ends whereby the thickness of the lining at any point is substantially proportional to the rate of wear at that point.

7. A brake comprising a rotatable drum having a curved surface, a train of brake shoes arranged circumferentially of said drum for cooperation therewith, each shoe of said train having a curved surface of the same radius as the curved surface of said drum, and brake lining interposed between said curved surfaces, said lining being shaped to conform to the curvature of said surfaces.

8. In a brake structure, a stationary base, a brake drum, a shoe pivoted at one of its ends to a point on said base located on a radius of the drum which is at substantially right angles to a line extending between the center of the brake shoe and the center of the brake drum, the surface of said shoe being formed on the same radius as the braking surface of the brake drum, a lining on said shoe and means for imparting swinging movement to said shoe.

9. In a brake structure, a stationary base, a brake drum, a brake shoe pivoted at one of its ends to said base, the surface of said shoe being formed on the same radius as the braking surface of the brake drum, and a lining on said shoe thicker at its center than at its ends.

10. In braking apparatus, the combination with a brake drum, of a pivotally mounted brake shoe with brake lining secured thereon, the brake lining carrying portion of the shoe having the same radius of curvature as the braking surface of the drum.

11. In braking apparatus, the combination with a brake drum, of a pivotally mounted brake shoe having a brake lining carrying surface of the same radius of curvature as the braking surface of the drum, and a brake lining thereon whose drum engaging surface has the same radius of curvature as the braking surface of the drum.

12. In braking apparatus, the combination with a brake drum having an internal cylindrical braking surface, of a brake shoe pivotally supported at one end and having a brake lining secured thereto, the lining carrying surface of the shoe and the drum engaging surface of the lining each having the same radius of curvature as the braking surface of the drum.

13. In braking apparatus, the combination with a brake drum, of a brake shoe pivotally supported at one end and provided with a friction element to engage the drum and destructible by braking wear, the portion of the shoe carrying the friction element having substantially the same radius of curvature as the braking surface of the drum, and the pivot of the shoe being so positioned that in the absence of the friction element the axis of the curvature of the aforesaid portion of the shoe, when said portion is in contact with the drum, approximately coincides with the axis of curvature of the braking surface of the drum.

14. In braking apparatus, the combination with a brake drum having a cylindrical braking surface, of a brake shoe adapted to cooperate therewith and having a brake lining carrying surface of substantially the same radius of curvature as the braking surface of the drum, and a brake lining thereon whose operative portion is of non-uniform thickness, being thinner at its ends than intermediate thereof.

15. In braking apparatus, the combination with a brake drum having a cylindrical braking surface, of a brake shoe adapted to cooperate therewith and having a brake lining carrying surface of substantially the same radius of curvature as the braking surface of the drum, and a brake lining thereon whose operative portion is of non-uniform thickness, being thinner at one end than at its center.

LYLE K. SNELL.